UNITED STATES PATENT OFFICE.

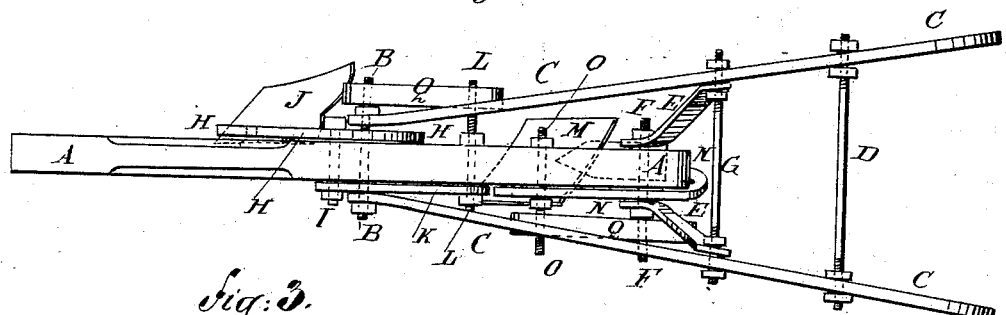
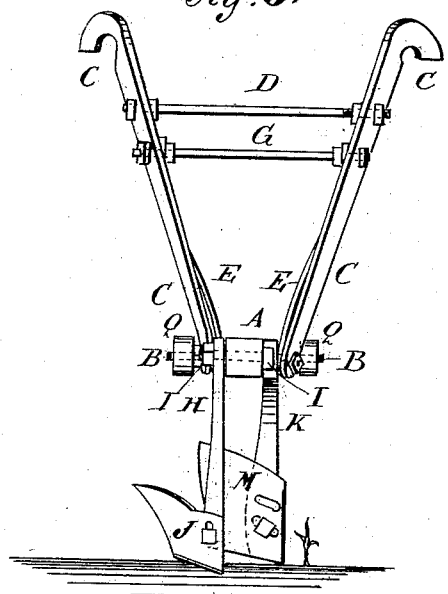
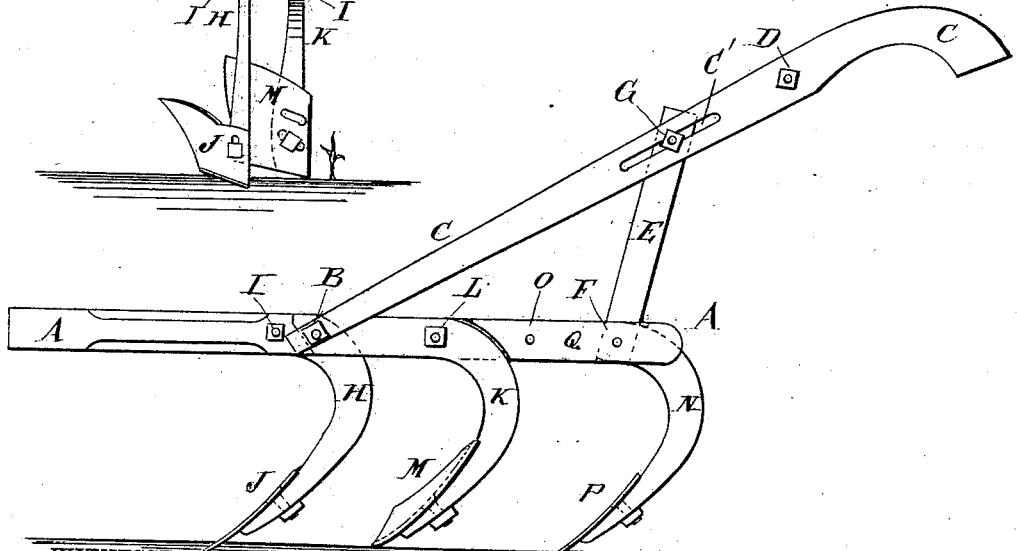

HIRAM L. P. POOL, OF NEW EDINBURG, ARKANSAS.

COMBINED SCRAPER, PLOW, AND CULTIVATOR.

SPECIFICATION forming part of Letters Patent No. 279,429, dated June 12, 1883.

Application filed January 24, 1883. (No model.)

*To all whom it may concern:*

Be it known that I, HIRAM L. P. POOL, of New Edinburg, in the county of Dorsey and State of Arkansas, have invented a new and useful Improvement in Combined Scrapers, Plows, and Cultivators, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same. Fig. 3 is a front view of the same.

The object of this invention is to facilitate the cultivation of cotton and other plants planted in rows or drills.

The invention consists in a combined scraper, plow, and cultivator constructed with a beam provided with adjustable handles and with adjustable bent standards, the first and last of which are provided with plows, and the intermediate one with a scraper. The bolts that secure the plow-standards to the beam are provided with blocks to be interposed between the front and rear standards and the beam to regulate the distance apart laterally of the three standards, and thus adapt the machine for use as a cultivator, as will be hereinafter fully described.

A is the plow-beam, to the opposite sides of the middle part of which is secured by a bolt, B, the forward ends of the handles C. The rear parts of the handles C are connected and held in proper relative position by a round, D. The handles C are supported at the proper elevation by the bars E, the lower ends of which are secured to the opposite sides of the rear end of the beam A by a bolt, F. The upper ends of the bars E are secured to the handles C a little in the rear of their centers by bolts or a round, G, which passes through the said bars E, and through longitudinal slots C' in the said handles C, as shown in Fig. 2, so that by loosening the nuts of the round G the handles C can be adjusted higher or lower, as the height of the plowman may require.

H is the forward plow-standard, the upper part of which is bent forward and is secured to the right-hand side of the beam A by the bolt B and by a second bolt, I.

To the lower end of the standard H is secured a plow, J, for removing trash from the side of a row of plants, and a short distance from it, as shown in Fig. 3.

K is the middle standard, the upper part of which is bent forward and is secured to the left-hand side of the plow-beam A by the bolt L, and one or both the bolts B I. To the lower end of the standard K is attached a scraper, M, for barring off the plants or turning the soil from the row of plants.

N is the rear standard, the upper part of which is bent forward and is secured to the left-hand side of the plow-beam A by the bolt F and a second bolt, O. To the lower end of the standard N is attached a plow, P, for dirting the plants. The upper part of the rear standard, N, is, as above stated, bent forward and secured to the left-hand side of the plow-beam, and is bent around and to the right and under the beam at its rear end and thence forward, as shown in Fig. 1, so that the point of the plow P lies under the beam, and somewhat to the right of its center and behind and opposite, or nearly so, to the middle of the scraper M, the plow P in its forward movements throwing the dirt on the row of plants. By this construction one side of a row of plants will be cleared of trash, barred off, and dirted at one passage of the machine along the said side of the row. By removing the middle standard, K, and the scraper M, and moving the forward standard, H, and its plow J to the rearward, a double plow will be formed. When the field is free from trash, the forward standard, H, and its plow J can be removed and the scraper and dirter used without the clearer. By replacing the plows J P and scraper M with small plows, and interposing blocks Q of suitable thickness between the standards H N and the beam A, an effective cultivator or side harrow will be formed.

I am aware that plow-standards interchangeable from front to rear of the beam, and plows having their mold-boards turned in opposite directions are old, and that spacing-blocks are a common form of adjustment of plow-standards, and I therefore lay no claim to such inventions.

Having thus described my invention, I claim as new and desire to secure by Letters Patent—

The combination, with the beam A and plow-handles C, of the curved interchangeable standards H K, secured to opposite sides of the plow-beam, and carrying, respectively, the trash-plow J and scraper M, curved standard N, secured to the left-hand side of the beam, and bent around and to the right and under said beam, and provided with the plow P, lying behind and opposite the middle of the scraper M, elongated threaded securing-bolts B L O and spacing-blocks Q, the whole arranged, constructed, and operated in the manner and for the purpose set forth.

HIRAM L. P. POOL.

Witnesses:
EVAN. P. MARKS,
W. D. ATTWOOD.